(12) United States Patent
Fundament et al.

(10) Patent No.: US 9,672,865 B2
(45) Date of Patent: Jun. 6, 2017

(54) SYSTEMS AND METHODS FOR TEMPORAL VISUALIZATION OF MEDIA ASSET CONTENT

(71) Applicant: United Video Properties, Inc., Santa Clara, CA (US)

(72) Inventors: Andrew Fundament, Arlington Heights, IL (US); Vanessa Wickenkamp, Elmhurst, IL (US); Brian Craig Peterson, Barrington, IL (US); David John Wheatley, Tower Lakes, IL (US); Jason William Conness, Pasadena, CA (US); Melissa Bradley, Mt. Prospect, IL (US)

(73) Assignee: Rovi Guides, Inc., San Carlos, CA (US)

( * ) Notice: Subject to any disclaimer, the term of this patent is extended or adjusted under 35 U.S.C. 154(b) by 293 days.

(21) Appl. No.: 14/292,076

(22) Filed: May 30, 2014

(65) Prior Publication Data

US 2015/0346955 A1 Dec. 3, 2015

(51) Int. Cl.
| | |
|---|---|
| G11B 27/00 | (2006.01) |
| H04N 5/445 | (2011.01) |
| H04N 21/84 | (2011.01) |
| H04N 21/482 | (2011.01) |

(52) U.S. Cl.
CPC ......... G11B 27/00 (2013.01); H04N 5/44543 (2013.01); H04N 21/4821 (2013.01); H04N 21/84 (2013.01); *H04N 2005/44573* (2013.01)

(58) Field of Classification Search
CPC .................................................... G06F 3/0484
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2008/0072145 A1* | 3/2008 | Blanchard | G06F 17/22 715/273 |

(Continued)

*Primary Examiner* — David Choi
(74) *Attorney, Agent, or Firm* — Ropes & Gray LLP

(57) ABSTRACT

Methods and systems described herein provide for visualizing content across different time segments of a media asset. Information about content within a particular time segment of a media asset is retrieved. This content information is generated by processing user-generated messages corresponding to the particular time segment. Content descriptors are generated based on the received content information corresponding to the particular time segment. A timeline is generated, independently of presenting a media asset, wherein the timeline visually associates content descriptors with their corresponding time segments of the media asset. When these content descriptors are selected by a user, the user-generated messages corresponding to the content descriptor at the corresponding time segment are displayed to the user.

18 Claims, 9 Drawing Sheets

(56) References Cited

U.S. PATENT DOCUMENTS

| | | | |
|---|---|---|---|
| 2009/0299725 A1* | 12/2009 | Grigsby | G06F 17/30817 704/2 |
| 2010/0153885 A1 | 6/2010 | Yates | |
| 2012/0136987 A1* | 5/2012 | Bostick | G06F 17/30911 709/224 |
| 2012/0290508 A1* | 11/2012 | Bist | G06F 17/30035 706/10 |
| 2012/0323891 A1* | 12/2012 | Jacobson | G06F 17/30023 707/722 |
| 2013/0014060 A1* | 1/2013 | Haddorp | G06F 17/30997 715/835 |
| 2013/0297706 A1 | 11/2013 | Arme et al. | |
| 2013/0311575 A1 | 11/2013 | Woods et al. | |
| 2014/0074855 A1* | 3/2014 | Zhao | G06F 17/3002 707/746 |
| 2015/0346955 A1* | 12/2015 | Fundament | G06F 3/04847 715/765 |

* cited by examiner

US 9,672,865 B2

SYSTEMS AND METHODS FOR TEMPORAL VISUALIZATION OF MEDIA ASSET CONTENT

BACKGROUND

Users often decide what media assets to consume and avoid based on the content type of the media asset. While conventional systems typically classify the content of media assets as a whole (e.g., plot summaries of programs, genre tags, etc.), this coarse-grained approach may oversimplify the varied content types within the media asset. Under these systems, users wishing to avoid undesirable segments and target desirable segments lack effective mechanisms for distinguishing between different types of content across different segments of a media asset.

SUMMARY

Accordingly, systems and methods are described herein for visualizing content types across different time segments of a media asset. By generating a timeline that visually associates content descriptors with time segments of the media asset, the systems and methods described provide a breakdown of content types across different time segments of the media asset. This visual breakdown helps users identify segments with undesirable content and segments with desirable content, enabling them to avoid undesirable segments and target the desirable ones.

For example, users may post messages commenting on a particular media asset (e.g., the TV show "Game of Thrones"). A system may process these messages to generate content descriptors to describe the content of various time segments of the media asset. For example, the content descriptor "violence" may be generated to correspond with the first time segment based on user messages commenting on violent events occurring during the first time segment of the media asset. The system generates a timeline which associates the content descriptors with their corresponding time segments based on the user messages. Any user may then interact with the timeline to view more information about each time segment by selecting a given content descriptor. In response to the user selection, the system presents the user with all the user messages commenting on relevant events associated with the content descriptor that occurred during the corresponding time segment.

In some aspects, the systems and methods described herein may receive user-generated messages associated with a media asset. For example, these user-generated messages may be user comments and/or reviews posted on a forum that is associated with a particular media asset (e.g., the TV show "Game of Thrones). In some instances, these user-generated messages may comment on particular events occurring during a particular time segment of the media asset. For example, a first user may post a first message (e.g., "Did you see him chop that guy's head off?!") at a first time point (e.g., 9:00 PM) commenting on a violent scene. A second user may post a second message (e.g., "That fight scene was so bloody") at a second time point (e.g., 9:02 PM) commenting on the same violent scene.

These user-generated messages are processed by the system to generate content descriptors corresponding to various time segments of the media asset. For example, if the system receives user-generated messages commenting on violent scenes occurring during the first time segment (e.g., between 9:00 PM and 9:15 PM) of a media asset (e.g., the TV show "Game of Thrones"), the system may process these user-generated messages to generate the content descriptor "violence" for the first time segment. In another example, if the system receives user-generated messages commenting on nudity scenes occurring during a second time segment (e.g., between 9:15 PM and 9:30 PM) of the media asset (e.g., the TV show "Game of Thrones"), the system may process these user-generated messages to generate the content descriptor "nudity" for the second time segment.

In some aspects, the system generates a timeline that visually associates each of the generated content descriptors with its corresponding time segment of the media asset. The timeline may be generated independently of presenting the media asset. That is, a user does not need to play a media asset to see the timeline of the content breakdown for the media asset. For example, the content descriptor "violence" may be displayed above the first time segment (e.g., between 9:00 PM and 9:15 PM in the visual timeline. In another example, the content descriptor "nudity" may be displayed above the second time segment (e.g., between 9:15 PM and 9:30 PM) in the timeline.

In some aspects, the system receives a user selection of a first content descriptor (e.g., "violence") in the timeline, wherein the first content descriptor corresponds to a first time segment (e.g., between 9:00 Pm and 9:15 PM) of the media asset. For example, the user may select the region of the timeline that displays the first content descriptor. In response to receiving the user selection, the system causes a set of user-generated messages corresponding to the first time segment (e.g., user messages posted about violent scenes occurring between 9:00 PM and 9:15 PM of the TV show "Game of Thrones") to be displayed to the user. For example, a mother may see that the content descriptor "violence" is displayed above the first time segment (e.g., between 9:00 PM and 9:15 PM) in the displayed timeline and click on the "violence" descriptor to find out more information about that first time segment. In response, the system provides the mother with all posted user messages commenting on the first time segment of the media asset, so that the mother can better assess whether that segment of the media asset is appropriate for her child.

In some embodiments, the systems and methods described herein provide for computing frequencies of words appearing in the user-generated messages corresponding to the first time segment. The system first determines which subset of user-generated messages from the received user-generated messages associated with the media asset (e.g., the TV show "Game of Thrones") corresponds to a first time segment (e.g., between 9:00 PM and 9:15 PM). The frequencies of words used in this subset are computed. For example, a system may receive 10 user messages (out of 60 total user messages received for the media asset) commenting on the first time segment of the media asset. Of the 10 messages, the system computes that the word "bloody" was used 7 times and the word "fight" was used 5 times. In some instances, the system uses these computed word frequencies to designate words with the highest frequencies as keywords describing the corresponding time segment. For example, if the word "bloody" was the most frequently used word in the first subset of messages, the system may determine that "bloody" is a keyword for content within the first time segment (e.g., between 9:00 PM and 9:15 PM) of the associated media asset (e.g., the TV show "Game of Thrones").

In some embodiments, the systems and methods described herein provide for generating content descriptors based on portions of received user-generated messages that represent content within a particular time segment of a media asset. In particular, the systems and methods describe provide for determining that a first portion of the user-generated messages of the first subset is representative of content within the first time segment of the media asset. For example, the representative first portion may be a keyword (e.g., the word "bloody", as discussed above) that appears frequently in a first group of user message postings commenting on the first time segment (e.g., between 9:00 PM and 9:15 PM) of the associated media asset (e.g., the TV show "Game of Thrones"). In another example, the representative first portion may be the entirety (e.g., "That fight scene was so bloody") or excerpt (e.g., " . . . fight scene . . . ") of one or more user message postings out of the first group of user message postings. The systems and methods described herein generates a first content descriptor such that the first content descriptor such that it includes the first representative portion. For example, if the representative first portion is a keyword (e.g., "bloody") of the first time segment of the media asset, the first content descriptor may be the keyword (e.g., "bloody") or include the keyword (e.g., "That fight scene was so bloody").

In some embodiments, the systems and methods described herein provide for processing the received user-generated messages associated with the media asset by performing sentiment analysis on the received user-generated messages of the first subset. For example, a system may perform sentiment analysis on all user message postings commenting on the first time segment e.g., between 9:00 PM and 9:15 PM) of a media asset (e.g., the TV show "Game of Thrones). The system then determines an overall viewing sentiment corresponding to the first time segment. For example, the user-message postings commenting on a violent scene may include phrases or words that indicate frustration, anger, disbelief, excitement, and/or other sentiments. In such instances, the sentiment analysis may accordingly yield overall viewing sentiments of "fear", "disbelief", "excitement", and/or other appropriate sentiments.

In some embodiments, the first content descriptor corresponding to the first time segment of a media asset includes one or more of the following: a portion (either a part or the entirety) of a user review commenting on the first time segment (e.g., " . . . fight scene . . . ", "That fight scene was so bloody"), a keyword commenting on the first time segment (e.g., "bloody"), a genre that represents content within the first time segment (e.g., "action", "adventure", "romance", "drama"), and a sentiment that represents the overall sentiment of the first subset of received user-generated messages (e.g., "fear", "excitement" (as discussed in previous paragraph)).

In some embodiments, the systems and methods described herein provide for determining a plurality of attributes that characterize content within the first time segment based on the first subset of received user-generated messages. For example, the attributes characterizing the first time segment (e.g., between 9:00 PM and 9:15 PM) of a media asset (e.g., the TV show "Game of Thrones") may be a set of words that were used in user message postings that describe a violent scene in the first time segment. In such an instance, these attributes may include words such as "blood", "fight", "scary", "horror", and "chop". A system then generates a selectable tag cloud as the first content descriptor which comprises these determined attributes that characterize the first time segment. The individual attributes in the generated tag cloud may be selectable.

When the system receives a user selection of one of the attributes in the tag cloud, the system causes a second subset of the user-generated messages to be displayed, wherein each of the second subset of user-generated messages is characterized by the selected attribute. In some cases, the second subset may be a subset of the first subset of received user-generated messages. For example, if a user selected the word "scary" from the tag cloud, the system may present the user with only the user message posting(s) corresponding to the first time segment (e.g., between 9:00 PM and 9:15 PM) that included the word "scary" or any variation thereof (e.g., "scared", "scare"). For example, a system may receive multiple user messages commenting on the first time segment of a media asset, including a first user message stating, "The fight scene was so scary" and a second user message stating, "That fight scene was awesome". In response to receiving a user selection of the attribute "scary" in the tag cloud, the system may cause the first user message to be displayed (because it is characterized by the "scary" attribute") and not the second user message (because it is not characterized by the "scary" attribute). By displaying only those messages that are characterized by a selected attribute in a tag cloud, the systems and methods described herein provide users with further details that are more relevant to their interests (e.g., finding out more about what/why/how a particular time segment is scary).

In some embodiments, the systems and methods described herein provide for updating a tag cloud across different time segments of a media asset to accurately reflect the changing types of content within each of those time segments. In particular, the systems and methods describe provide for generating a tag cloud that represents content within the first time segment of a media asset based on a first subset of received user-generated messages. For example, as discussed above, a system may receive user message postings commenting on a violent scene occurring within the first time segment (e.g., between 9:00 PM and 9:15 PM) of a media asset (e.g., the TV show "Game of Thrones") and generate a tag cloud, for display in the timeline, with attributes that represent those received user message postings commenting on the first time segment (as discussed in the paragraph above).

In response to processing user-generated messages corresponding to a second time segment of the media asset, the system updates the tag cloud that is currently displayed in the timeline to represent content within the second time segment of the media asset. For example, the system may receive user message postings, while a media asset is being broadcast, commenting on a nudity scene occurring in a currently airing second time segment (e.g., between 9:15 PM and 9:30 PM) of a media asset (e.g., the TV show "Game of Thrones"). In response to processing these user message postings, the system may update the currently displayed tag cloud in the timeline (e.g., which represents content within the first time segment) to represent content within the second time segment of the media asset. For example, if user message postings commenting on the second time segment mostly relate to a nudity scene, as opposed to a violent scene from the first time segment, the system updates the tag cloud that is displayed in the timeline to contain attributes that characterize the discussed nudity scene instead. In such instances, the tag cloud displayed in the timeline is continuously updated to reflect real-time changes in content across different time segments of a media asset.

In some embodiments, the systems and methods described herein provide for generating a graphical histogram representing change in the level of a given attribute across different time segments of a media asset. The levels of the attribute for each time segment are computed based on the received user-generated messages that correspond to each of the different time segments. For example, the system may determine that the attribute "violence" characterizes a particular media asset (e.g., the TV show "Game of Thrones"). The system computes a first level of the attribute based on received user-generated messages corresponding to the first time segment (e.g., between 9:00 PM and 9:15 PM) of the media asset. The system also computes a second level of the attribute based on received user-generated messages corresponding to the second time segment (e.g., between 9:15 PM and 9:30 PM) of the media asset. For example, if more user message postings corresponding to the first time segment comment on violent scenes than user message postings corresponding to the second time segment, the system may compute a higher level of the "violence" attribute for the first time segment than the second time segment. In some instances, the computed level may be expressed as a percentage of user messages that are characterized by a given attribute. For example, 80% of the user message postings corresponding to the first time segment may be characterized by the "violence" attribute, whereas 20% of user message postings corresponding to the second time segment may be characterized by the "violence" attribute.

Once the levels of a given attribute are computed for each of the time segments of a media asset, the system displays the change in the compute levels in a graphical histogram, such that the graphical histogram visually associates the computed first level of the attribute (e.g., 80% violence) with the first time segment (e.g., between 9:00 PM and 9:15 PM) and the computed second level of the attribute (e.g., 20% violence) with the second time segment (e.g., between 9:15 PM and 9:30 PM). This way, users wishing to avoid violent scenes (e.g., a mother who is deciding which parts of a program are inappropriate for her child) may skip over those time segments that have been identified as being more violent, whereas users who enjoy watching violent scenes may directly skip to those violent scenes.

In some embodiments, the systems and methods described herein allow a user to edit a content descriptor for a particular time segment in a timeline for a media asset. The system receives an indication from a user to change a first content descriptor corresponding to a first time segment of a media asset. For example, a user may select an option to add to or replace a currently content descriptor to a particular time segment. In response to receiving the user's indication to change the first content descriptor, the system generates for display a list of content attributes from which a user may select an additional or replacement content descriptor. Once this content attribute is selected from the list, the system updates the first content descriptor with the newly selected content attribute.

For example, if the user decides that a currently displayed content attribute does not appropriately represent the content of the first time segment of the media asset, the user may choose to replace the content attribute (e.g., "violence") with another, more representative content attribute selected from the list (e.g., "frightening"). In response, the system may replace the previous content attribute (e.g., "violence") with the newly selected content attribute (e.g., "frightening") from the list. In another example, if the user decides that another content attribute is needed to adequately represent the varied content within a first time segment, the user may select an additional attribute from the list (e.g., "profanity") to represent the content within the first time segment. In such instances, the first content descriptor may comprise multiple attributes (e.g., "violence" and "profanity"). This feature allows users to modify content descriptors, which may have been automatically generated, to more accurately reflect their interpretations of content within a media asset segment.

In some embodiments, the systems and methods described herein provide for visually indicating particularly popular and/or controversial segments of a media asset. In particular the systems and methods described provide for determining which time segment of a media asset corresponds to the highest number of received user-generated messages and then visually highlighting that segment in the timeline so that the user is alerted to that particular segment. For example, a system may receive 100 user message postings commenting on a particular segment (e.g., between 9:45 PM and 10:00 PM) of a media asset and only 20 or less user message postings commenting on other time segments of the media asset. In such an instance, the high number of user message postings for the first time segment may indicate that the particular time segment (e.g., between 9:45 PM and 10:00 PM) is more interesting than the other segments, as it provoked more user discussion. The system highlights this particular time segment in the timeline so that users wishing only to watch the most interesting/controversial/popular segments may immediately jump to the highlighted segment indicated by the timeline.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
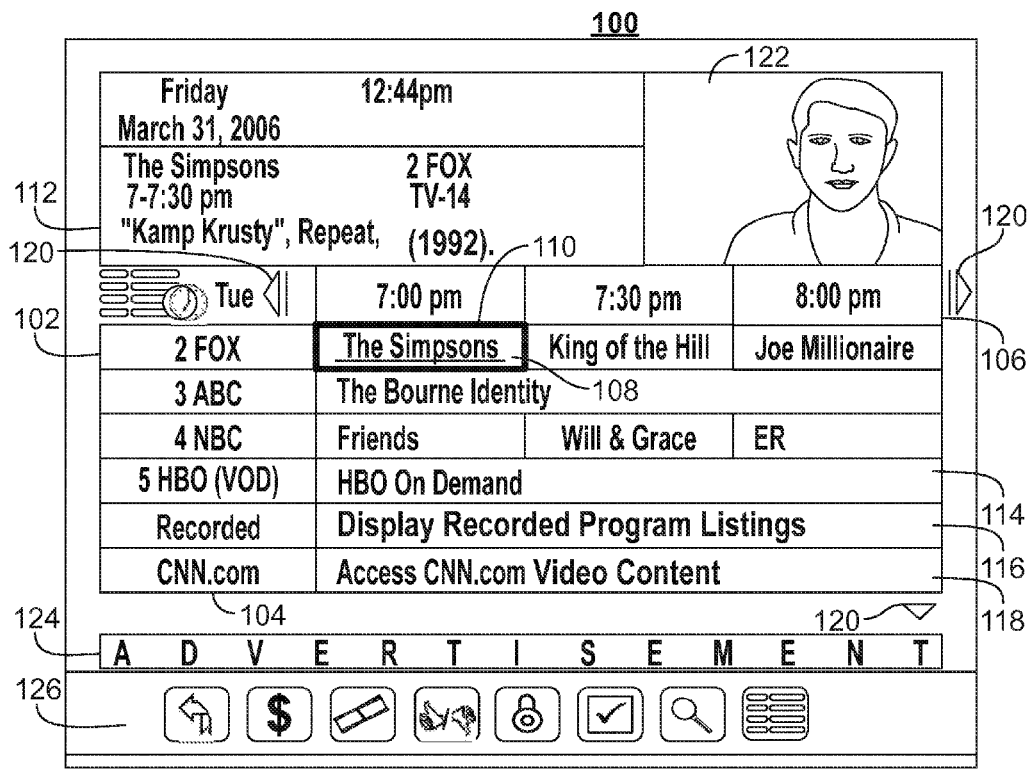
FIGS. 1 and 2 show illustrative display screens that may be used to provide media guidance application listings in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. As referred to herein, "content" should also be understood to encapsulate dynamic aspects of a media asset (e.g., events, storyline, music, etc.), which change across time segments of the media asset, and static aspects of a media asset (e.g., characters, actors, titles, theme), which stay the same across time segments of the media asset.

The content of media assets may be divided into different time segments. As referred to herein, a "time segment" or "segment" of a media asset should be understood to mean any contiguous block of content within a media asset that is defined by a start time and end time. As referred to herein, a "first time segment" of a media asset refers to a contiguous block of content bound by a particular set of start and end times. Each of the start and end times that bind a particular time segment of a media asset can be any time point within the entire duration of the media asset. As referred to herein, a "second time segment" refers to another continuous block of content bound by another set of start and end times. A "first time segment" may or may not overlap with a "second time segment" of a same media asset. A "first time segment" occurs before a "second time segment", or a "second time segment" may occur before a "first time segment". As referred to herein, a "first time segment" and a "second time segment" are used interchangeably within the present disclosure.

Each time segment of a media asset contains content that may be characterized by a "content descriptor". As referred to herein, "content descriptor" or "descriptor", in both their singular and plural forms, should be understood to mean information that describes the aforementioned "content". For example, content descriptors may include but are not limited to words, sentences, phrases, graphics, metadata, and any other information that could be used to describe a particular content.

Content descriptors for a media asset may be generated by processing user-generated messages associated with the media asset. As referred to herein, "user-generated messages" or "user messages", in both their singular and plural forms, should be understood to mean any information that is created by a human user. For example, user-generated messages associated with a media asset may include, but are not limited to, user reviews, user feedback, user comments on a website forum, emails, letters, user-generated metadata, etc. containing information about content of a media asset.

User-generated messages associated with a media asset may be processed to generate a plurality of attributes that characterize content with a media asset. As referred to herein, "attribute" or "content attribute" should be understood to mean any characteristic of media asset content. For example, attributes may include, but are not limited to, a genre of a media asset (e.g., "action", "drama", "romance", "horror", etc.), a content rating designated for the media asset (e.g., PG, PG-13, R), and/or any word or phrase used to describe or represent the type of content within the media asset (e.g., "scary", "exciting", "boring").

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
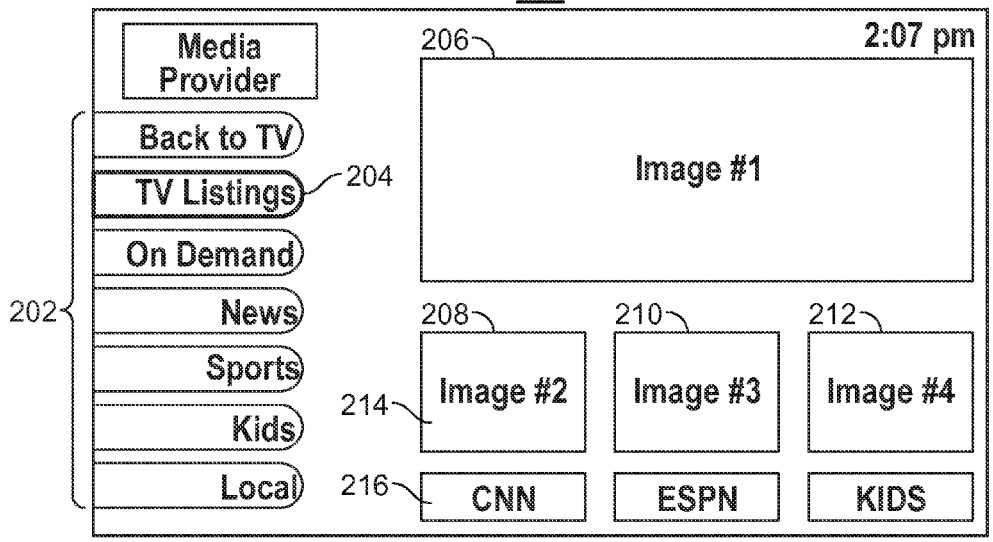

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In some embodiments, in response to receiving a user selection of a media asset (e.g., program listing 108) in media guidance display (e.g., program listings display 100), control circuitry 304 of user equipment device 300 (see FIG. 3) may generate for display a temporal visualization of media asset content associated with the selected program listing. Further details about the displayed temporal visualization is discussed below in relation to FIGS. 5-9.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
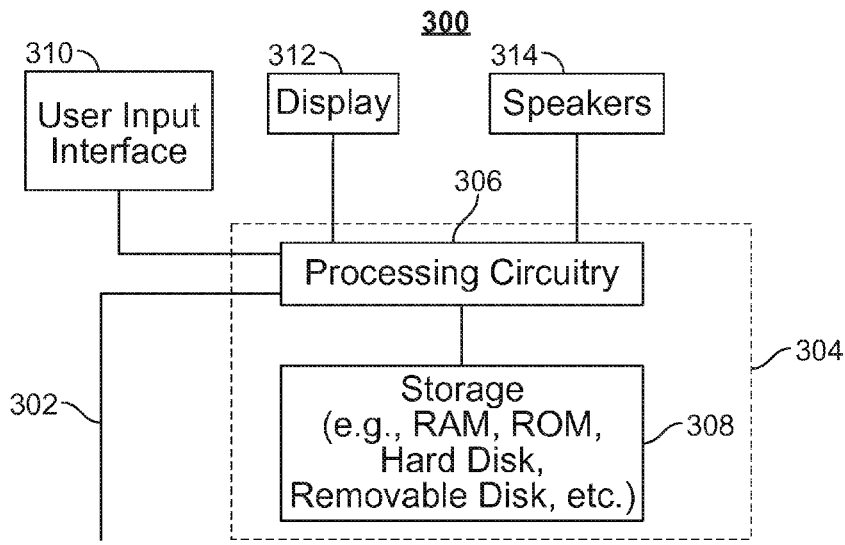
FIG. 3 shows an illustrative user equipment device in accordance with another embodiment of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
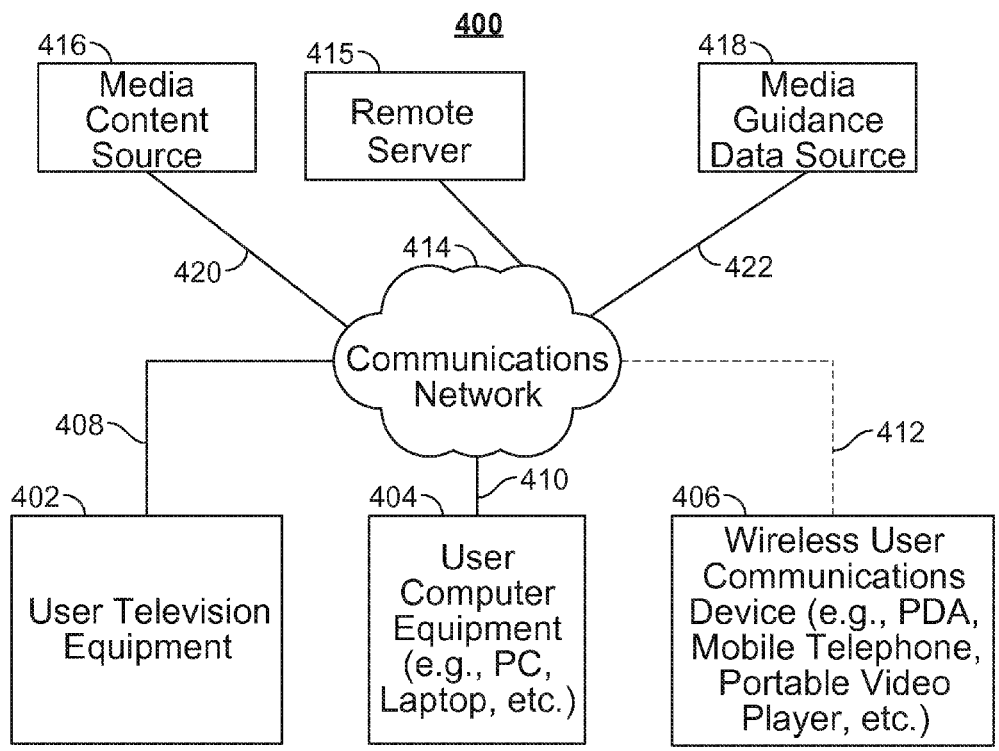
FIG. 4 is a diagram of an illustrative cross-platform interactive media system in accordance with another embodiment of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server 415. For example, media guidance applications may be implemented partially as a client application on control circuitry 304 of user equipment device 300 and partially on a remote server 415 as a server application (e.g., media guidance data source 418) running on control circuitry of the remote server 415. When executed by control circuitry of the remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, a remote server 415 couple to communications network 414 may host a website, social network, blog, discussion forum, and/or news site. Remote server 415 may include the same or similar circuitry or components as control circuitry 304. Remote server 415 may receive a plurality of user-generated messages from a plurality of users at different user equipment devices 300. This plurality of users may post messages (e.g., user reviews, comments, etc.) to remote server 415 that comment on a media asset as whole and/or particular segments within a media asset. In some instances, a user-generated message may explicitly identify a time point or time segment of the media asset that relates to the commentary provided in the message. In the same or other instances, a user-generated message may be associated with a posting time, which serves as a timestamp of when the user posted the message. Remote server 415 may process these received user-generated messages to identify the media asset, the time segment that is associated with a user-generated message, and/or a type of content within the identified time segment.

In some embodiments, remote server 415 identifies the associated media asset by cross-referencing proper nouns or content labels contained within a user-generated message with a database of media asset titles. This database of media asset titles may reside on media content source 416 and/or media guidance data source 418. Remote server 415 may access the database by communicating with media content source 416 and/or media guidance data source 418 over communications network 414.

In some embodiments, remote server 415 uses the time information explicitly identified by the user in a user-generated message, separately or in conjunction with the posting time of the user-generated message, to identify a particular time segment that corresponds to the user-generated message. Mechanisms for identifying a time segment corresponding to user-generated input are described in greater detail in Woods et al. U.S. Patent Application Publication No. 2013/0311575, filed May 16, 2012, and Woods et al. U.S. Patent Application Publication No. 2013/0297706, filed May 3, 2012, which are hereby incorporated by reference herein in their entireties.

In some embodiments, remote server 415 identifies a type of content within the identified time segment of the media asset based on textual analysis of the corresponding user-generated message itself. More details about the process of identifying content types for a particular time segment of a media asset based on user-generated messages are discussed in relation to the generation of content descriptors in FIG. 11. Content types may include content ratings. Remote server 415 may employ mechanisms to determine whether a particular time segment of a media asset violates a parental control setting. These mechanisms are discussed in greater detail in Woods et al. U.S. patent application Ser. No. 13/463,364, filed May 3, 2012 (as mentioned above).

Once remote server 415 identifies the media asset, time segment, and/or content type associated with a given user-generated message, remote server 415 stores these pieces of information in its remote storage. User equipment device 300 may retrieve this stored information from remote storage of remote server 415 by communicating with remote server 415 over communications network 414.

Users at user equipment devices 300 may wish to visualize the spectrum of different content types across different segments of a media asset so that they can better identify which segments contain undesirable content and which segments contain desirable content, based on the users' individual preferences. As described herein, systems and methods provide for visualizing content types across different time segments of a media asset based on user-generated messages associated with different segments of a media asset.

Figure 5:
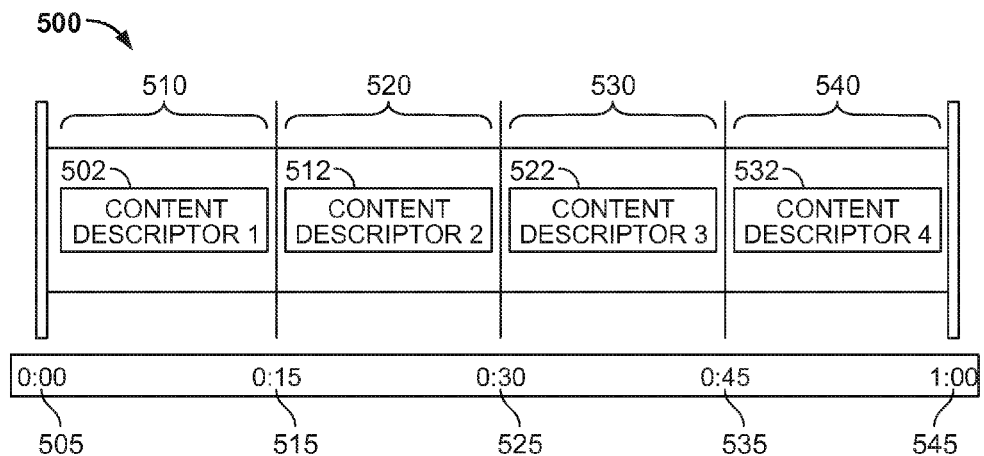
FIG. 5 is an illustrative temporal visualization of media asset content using content descriptors to describe content within different time segments of a media asset in accordance with some embodiments of the disclosure.

FIG. 5 is an illustrative temporal visualization of media asset content using content descriptors to describe content within different time segments of a media asset in accordance with some embodiments of the disclosure. As discussed in relation to FIG. 1, control circuitry 304 of user equipment device 300 may generate for display on display 312 a graphical timeline 500 in response to receiving a user selection of a media asset (e.g., program listing 108 in program listings display 100). In some embodiments, graphical timeline 500 may visually associate each of a plurality of content descriptors 502, 512, 522, and 532 with its corresponding time segment of a media asset 510, 520, 530, and 540, respectively.

Each time segment is defined by a start time and end time within the entire duration of a media asset. For example, if graphical timeline 500 represents the entire duration of a media asset (e.g., a TV show), then the media asset would begin at time 505 (e.g., "0:00") and end at time 545 (e.g., "1:00"), representing that the media asset is 1 hour long. In accordance with illustrative graphical timeline 500, a first time segment 510 contains content between time 505 (e.g., "0:00") and time 515 (e.g., "0:15") of a media asset. A second time segment 512 contains content between time 515 (e.g., "0:15") and time 525 (e.g., "0:30") of the media asset. A third time segment 530 contains content between time 525 (e.g., "0:30") and time 535 (e.g., "0:45") of the media asset. A fourth time segment 540 contains content between time 535 (e.g., "0:45") and time 545 (e.g., "1:00").

In some embodiments, control circuitry 304 generates graphical timeline 500 (and any other graphical timelines 600, 700, 800, and 900 as described herein) independently of presenting the media asset. For example, in response to receiving a user selection of a media asset in a media guidance listing, control circuitry 304 may generate for display graphical timeline 500 as part of an informational display that provides more information about the media asset without displaying the content of the media asset itself.

Control circuitry 304 retrieves information about content within each of a plurality of time segments from remote server 415. This retrieved information includes the start and end times (e.g., time points 505, 515, 525, 535, and 545) of various time segments (e.g., 510, 520, 530, and 540) within a media asset. This retrieved information also includes information for generating content descriptors (e.g., 502, 512, 522, and 532) which describe content within the corresponding time segments. Prior to retrieval of this information by control circuitry 304, remote server 415 generated this information based on user-generated messages associated with the media asset. Further details about processing user-generated messages to generate content descriptors are discussed later on in relation to FIG. 11.

In some embodiments, content descriptors may include portions of the user-generated messages associated with various time segments of a media asset. For example, content descriptor 501 may include one or more keywords from user-generated forum messages relating to events occurring during time segment 510 of a media asset (e.g., the TV show "Game of Thrones"). Remote server 415 processes the relevant user-generated messages to determine which keywords appropriately represent content within a particular time segment. For example, if a violent scene occurred during time segment 510 of a media asset (e.g., the first 15 minutes of the TV show "Game of Thrones"), keywords from user message postings may include words such as, but not limited to, "bloody", "fight", and "scary".

Content descriptor 510 may be displayed in timeline 500 as one or more of these keywords. Alternatively, content descriptors may include excerpts or entire portions of representative user-generated messages relating to a particular time segment. For example, remote server 415 may determine that the user reviews "That fight scene was so bloody" and "Did you see him chop that guy's head off?!" are representative descriptions of content within time segment 510. In some instances, remote server 415 may extract excerpts of one or both of these user reviews and store them in remote storage as representative descriptions of content within time segment 510. Control circuitry 304 may then retrieve these excerpts and instruct display 312 to display them as part of content descriptor 502. Alternatively, the entirety of one or more representative user reviews may be displayed in content descriptor 502. The processes used to generate content descriptor 502 corresponding to time segment 510 may be applied to all content descriptors (e.g., 502, 512, 522, and 532) of all time segments of a media asset (e.g., 510, 520, 530, and 540).

In some embodiments, content descriptors may include a sentiment attribute that represents the overall viewing sentiment of users for a particular segment of a media asset. To determine the sentiment attribute for a particular time segment, remote server 415 processes user-generated messages associated with a particular time segment of a media asset by performing sentiment analysis on the user-generated messages. In some embodiments, remote server 415 performs natural language processing and/or any other form of textual/language processing on user-generated messages to determine clusters of words that represent a particular sentiment, mood, or emotion. Examples of sentiments include, but are not limited to, excitement, anger, frustration, boredom, surprise, disappointment, sadness, relief, shock, horror, happiness, peace, approval, disgust, and any other sentiment that could be used to express a user's reaction to consuming a particular media asset.

For example, if phrases and words like "I can't believe", "shocked", "wow", "unexpected" appear in user-generated messages associated with a time segment (e.g., 510, 520, 530, 540, etc.) of a media asset, remote server 415 may determine that the overall viewing sentiment of the time segment is "disbelief" or "surprise". In some embodiments, remote server 415 determines one or more sentiment attributes for any or all time segments of a media asset and stores the determined sentiment attribute(s) in local storage 308 along with along content type information corresponding to a content descriptor for a particular time segment (e.g., content descriptor 3 corresponding to time segment 530). In some embodiments, control circuitry 304 retrieves attribute information about a particular time segment from remote server 415 over communications network 414 and instructions display 312 to display the sentiment attribute in the relevant content descriptor (e.g., content descriptor 522) of graphical timeline 500.

In some embodiments, content descriptors include information that is not extracted from user-generated messages. For example, control circuitry 304 of user equipment device 300 may retrieve metadata information about a particular media asset from media content source 416 and/or media guidance data source 418 over communications network 414. This metadata information may include content tags that classify the media asset by genre, content, and/or any other information that describes media content. In particular, these content tags may be specific to specific time segments of the media asset. For example, control circuitry 304 may receive a content tag of "violence" from media guidance data source 418 or media content source 416 for time segment 510 of a media asset. Control circuitry 304 may then use this content tag to generate content descriptor 502 to be the content tag "violence". In other embodiments, remote server 415 may receive information about content tags for particular time segments of a media asset from media guidance data source 418 or media content source 416. It may process this content tag information along with information extracted from user-generated messages relating to the media asset to generate information that describes the content of the media asset at different segments of the media asset. Remote server 415 stores this processed information, which is later retrieved by control circuitry 304 of user equipment device to generate content descriptors for timeline 500.

Although graphical timeline 500 shows four content descriptors 502, 512, 522, and 532 corresponding to four time segments 510, 520, 530, and 540, respectively, any number of content descriptors, their corresponding time segments, may be shown in accordance with other embodiments. Additionally, while the time segments (510, 520, 530, and 540) are equal in length of time, other embodiments of graphical timeline 500 may be comprised of time segments that are not of equal length.

Figure 6:
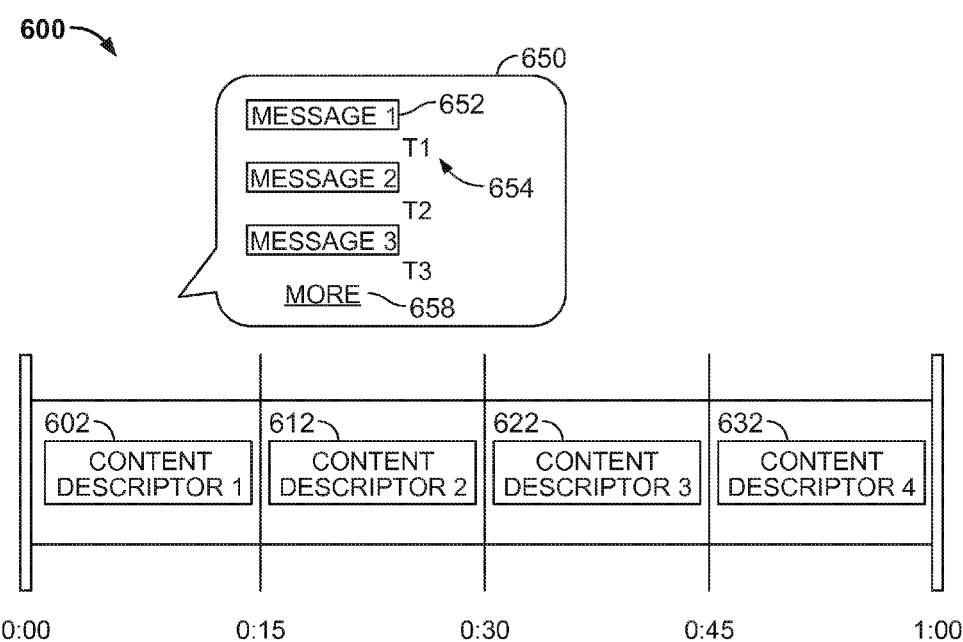
FIG. 6 is an illustrative interface for interacting with a temporal visualization of media asset content in accordance with some embodiments of the disclosure.

FIG. 6 is an illustrative interface for interacting with a temporal visualization of media asset content in accordance with some embodiments of the disclosure. Content descriptors 602, 612, 622, and 632 are interchangeable with content descriptors 502, 512, 522, and 532, respectively, as described in relation to FIG. 5 above. Each of these content descriptors may be selectable by a user, as well as their corresponding time segments in the timeline (e.g., 510, 520, 530, and 540). Control circuitry 304 may instruct display 312 to display graphical timeline 500 in illustrative interface 600. As illustrative interface includes the display of graphical timeline 500 (of FIG. 5), all discussion of FIG. 5 also applies to illustrative interface 600. In response to receiving a user selection of a content descriptor (e.g., 602) or the corresponding first time segment (e.g., the first 15 minutes) in the timeline, control circuitry 304 may instruct display 312 to display an overlay 640 comprising one or more user-generated messages (e.g., 652) relating to the first time segment. In some instances these messages may be user comments or reviews posted on a website. The website may be a user blog that discusses the media asset or a discussion forum for the media asset.

Alternatively, the website may be an informational parental control page that describes objectionable scenes within a media asset. Each message (e.g., 652) displayed in the overlay 650 may correspond to a particular posting time 654. For example, remote server 415 may receive a user message corresponding to message 652 that was posted on a website at time 654 (e.g., 10 minutes into the media asset). Time 654 falls within the first time segment (e.g., first 15 minutes of the media asset) of the media asset. Remote server 415 determines which user-generated messages are more representative of a particular segment of a media asset. Control circuitry 304 retrieves the most representative user-generated messages from remote server 415 corresponding to a particular time segment and instructs display 312 to display them in overlay 650.

In some embodiments, control circuitry 304 only displays a portion of the user message. In some embodiments, control circuitry 304 also instructs display 312 to display a selectable link 658 in overlay 650. In response to receiving a user selection of link 658 and/or any of the messages (e.g., 652) displayed in the overlay, control circuitry 304 instructs display 312 to display another interface 1000, which displays more and/or all user-generated messages associated with the first time segment, as well as other information about the first time segment. Further details about interface 1000 are discussed later on in relation to FIG. 10.

In some embodiments, control circuitry 304 may determine which of a plurality of time segments corresponds to the highest number of user-generated messages. For example, if remote server received 100 user-generated messages commenting on time segment 520 and only 50 or less user-generated messages commenting on each of the other time segments (e.g., 510, 530, 540), control circuitry may instruct display 312 to visually highlight, in any of timelines 500, 600, 700, 800 and 900, the time segment with the highest number of associated user-generated messages. This highlighting feature will allow users to more easily identify time segments within a media asset that are particularly popular, contentious, and/or interesting.

Figure 7:
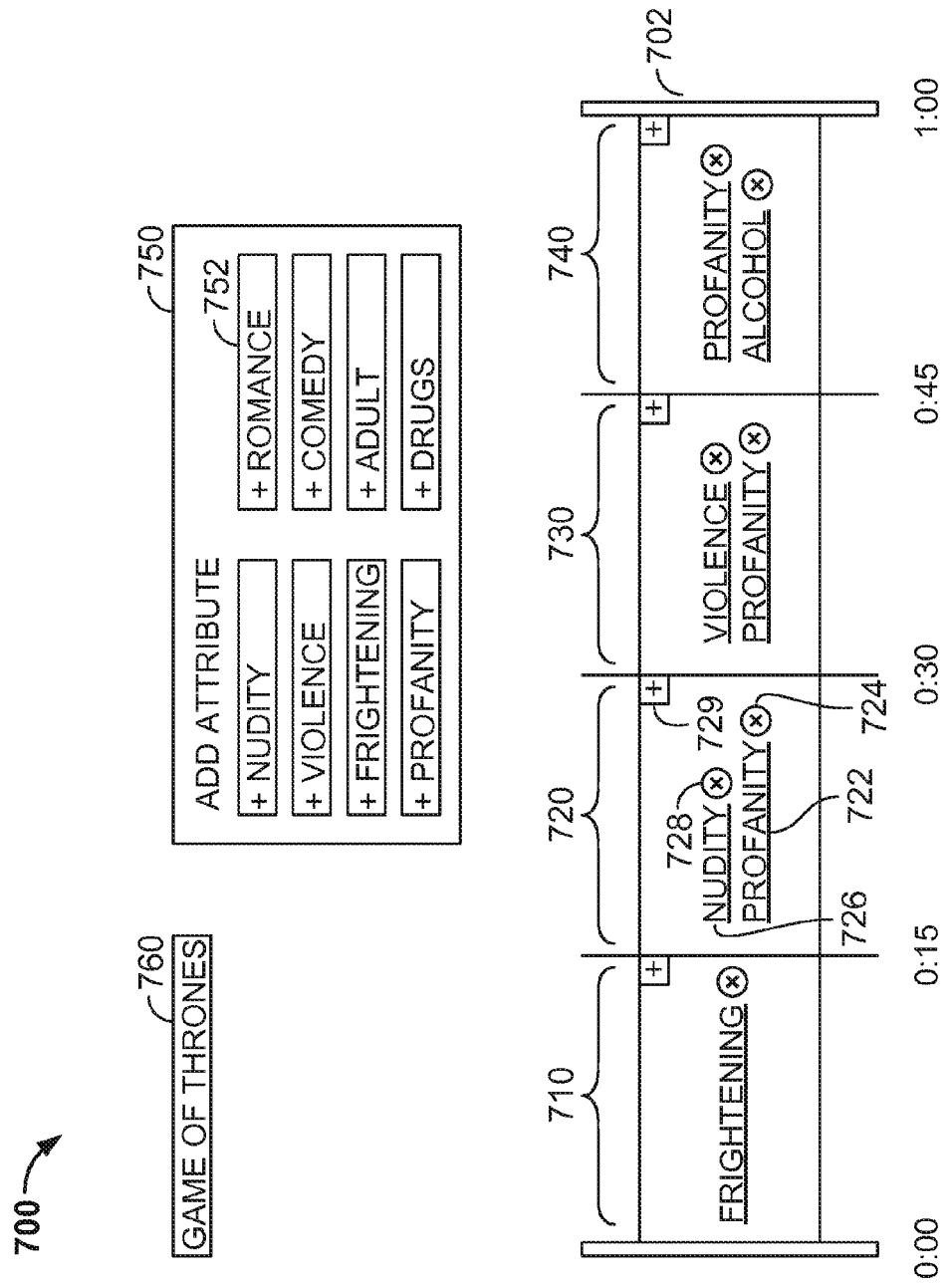
FIG. 7 is an illustrative graphical interface for editing content descriptors displayed in a temporal visualization of media asset content in accordance with some embodiments of the disclosure.

FIG. 7 is an illustrative graphical interface for editing content descriptors displayed in a temporal visualization of media asset content in accordance with some embodiments of the disclosure. More details about the mechanisms involved in editing content descriptors are discussed in relation to FIG. 12. In these embodiments, control circuitry 304 may instruct display 312 to display illustrative graphical interface 700 with graphical timeline 702 in accordance to processes described in relation to graphical timeline 500 in FIG. 5. Interface 700 allows a user to remove one or more currently displayed attributes from a displayed content descriptor or add one or more attributes to a content descriptor for each of the time segments of a media asset (e.g., 71-, 72-, 730, and 740). Graphical timeline 702 is an illustrative example of timeline 500 that provides explicit examples of content descriptors for different segments (e.g., 710, 720, 730, and 740) of a media asset with title 760 (e.g., "Game of Thrones"). Control circuitry 304 may generate an option to add content attributes (symbolized by the "+" indicator) and an option to remove an attribute from a currently displayed content descriptor (symbolized by the "x" indicator) for each time segment of a media asset.

In some embodiments, each attribute (e.g., 722, 726) displayed in a given content descriptor can be removed via selectable removal options (e.g., 724, 738). For example, in response to receiving a user selection of removal option 728 associated with selectable content attribute 728 ("nudity"), control circuitry 304 instructs display 314 to remove attribute 728 from the display of interface 700. Control circuitry 304 also instructs storage 308 to update attribute information corresponding with time segment 710 such that attribute 726 is no longer associated with the content descriptor corresponding to time segment 710. Control circuitry 304 may instruct storage to remove attribute 726 from information associated with time segment 710 before, after or at the same time control circuitry 304 instructs display 316 to remove attribute 726 from display of interface 700.

In some embodiments, each time segment (e.g., 710, 720, 730, and 740) is associated with an option to add additional content attributes (e.g., option 729 which corresponds to time segment 720). In response to receiving a user selection of option 729, control circuitry 304 instructs display 312 to display one or more potential attributes which may be used to describe content within time segment 720. In one embodiment, control circuitry 304 may instruct display 312 to display the one or more potential attributes as an overlay 750. In another embodiment, the overlay may be an entirely different screen than 700. In either embodiments, control circuitry 304 may retrieve potential attribute information locally from storage and/or directly or indirectly from remote server 415, media content source 416, and media guidance data source 418. Potential attribute information may include content tags that describe content within particular segments of a media asset. For example, content tags may be user-generated by users who manually annotate content at user equipment devices 300. In another example, remote server 415 or control circuitry 304 may automatically generate content tags based on textual or content analysis of a media asset. Mechanisms for automatically identifying content types of particular segments of a media asset are discussed in greater detail by Soroushian et al. U.S. Patent Application Publication No. 2014/0052696, filed Aug. 20, 2012, which is incorporated herein in its entirety.

A user who already watched time segment 720 may decide that time segment 720 of a media asset 760 can also be described using another attribute (e.g., "romantic"). In response to receiving a user selection of a potential attribute 752 (e.g., "romance"), control circuitry 304 instructs storage 308 to add attribute 752 to the content descriptor corresponding to time segment 720 of media asset 760. Control circuitry 304 also instructs display 312 to update the display of interface 700 to add attribute 752 to the content descriptor corresponding to time segment 720 of timeline 702. As discussed with the order of steps for removing an attribute, control circuitry 304 may instruct storage to update attribute information before, after, or at the same time control circuitry 304 instructions display 312 to update the display of the interface 700.

Figure 8A:
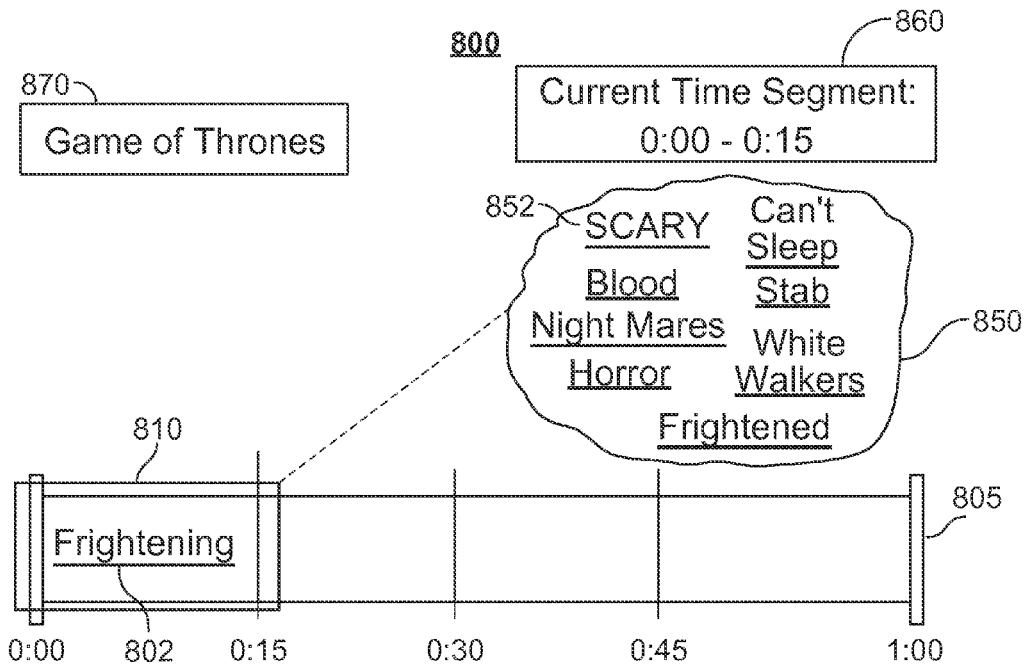
FIG. 8A is an illustrative interface for interacting with a temporal visualization of content within a first time segment of a media asset using a tag cloud in accordance with some embodiments of the disclosure.

FIG. 8A is an illustrative interface for interacting with a temporal visualization of content within a first time segment of a media asset using a tag cloud in accordance with some embodiments of the disclosure. In these embodiments, control circuitry 304 may instruct display 312 to display illustrative interface 800 with graphical timeline 805 and an additional feature of a tag cloud 850 which displays attributes (e.g., 852) describing content within a particular time segment (e.g., "0:00-0:15") of media asset 870 (e.g., "Game of Thrones"). Control circuitry 304 generates graphical timeline 805 in accordance with all mechanisms and features as discussed in relation to FIGS. 7 and 5. As referred to herein, a "tag cloud" should be understood to mean a collection of attributes that describe a particular content (e.g., content within a time segment of a media asset). Control circuitry 304 may display tag cloud 850 as part of or an extension of a content descriptor corresponding to time segment 860. In some embodiments, control circuitry 304 may retrieve the attributes of tag cloud 850 from remote server 415, media content source 416, and/or media guidance data source 418 in a similar manner as discussed in relation to the list of potential attributes displayed in overlay 750 (see FIG. 7).

In some embodiments, control circuitry 304 may assign the tag cloud attributes to be keywords extracted from user-generated messages relating to time segment 860 of media asset 870. Control circuitry 304 may determine these keywords in a similar manner as discussed in relation to keyword generation in FIG. 5. Additionally, in some embodiments, control circuitry 304 may determine a limit on the number of attributes to display in the tag cloud.

Attributes displayed in the tag cloud 850 may be selectable by a user. For example, in response to receiving a user selection of attribute 852 (e.g., "scary"), control circuitry 304 instructs display 312 to display interface 1000 which lists all user-generated messages associated with time segment 860 of media asset 870. In some embodiments, control circuitry 304 displays user-generated messages relating to the selected attribute 852 (e.g., "scary"), which may or may not be all user-generated messages associated with time segment 860 of media asset 870. Further details about interface 1000 are discussed later on in relation to FIG. 10.

Control circuitry 304 may instruct display 312 to visually associate tag cloud 850 with a particular time segment 860 by highlighting the time segment (e.g., using highlighter 810) on timeline 805. In addition to attributes composing the tag cloud, time segment 860 may also be labeled with a representative attribute as a content descriptor displayed in the timeline. This representative attribute is similar to the content descriptors 728 and 722 discussed in relation to FIG. 7. In some embodiments, control circuitry 304 may receive a broadcast of media asset 870 and update the attributes within tag cloud 850 in real-time. In such instances, control circuitry 304 may instruct display 312 to update the display to reflect new content within a new time segment. Further details about the updated display are discussed in relation to FIG. 8B below.

Figure 8B:
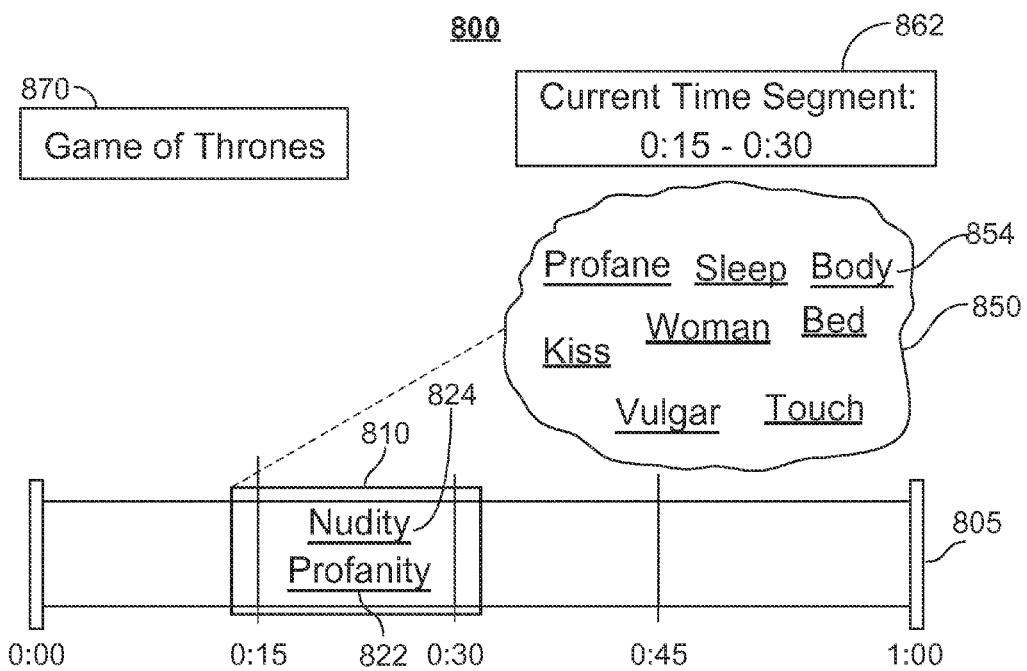
FIG. 8B is an illustrative interface for interacting with a temporal visualization of content within a second time segment of the media asset in FIG. 8A using a tag cloud in accordance with the same embodiments of the disclosure.

FIG. 8B is an illustrative interface for interacting with a temporal visualization of content within a second time segment of the media asset in FIG. 8A using a tag cloud in accordance with the same embodiments of the disclosure. Control circuitry 304 instructs display 312 to display an updated interface 800. Remote server 415 may receive user-generated messages associated with new time segment 862 of media asset 760. For example, these user-generated messages may be live commentary posted by users about events occurring during a broadcast media asset. Remote server 415 may process these user-generated messages corresponding to new time segment 862 and push them to control circuitry 304 over communications network 414. In response, control circuitry 304 updates interface 800, as shown in FIG. 8B.

Updated interface 800 in FIG. 8B is formatted and generated similarly to interface 800 in FIG. 8B, except that updated interface 800 in FIG. 8B updates attributes within tag cloud 850 to represent content within new time segment 862 (e.g., "0:15-0:30"). Accordingly, control circuitry 304 also updates the location of highlighter 810 to highlight the new time segment 862 in timeline 805. For example, in contrast to time segment 860 of FIG. 8A which contained frightening scenes, subsequent time segment 862 of FIG. 8B may contain less frightening scenes and scenes that contain more nudity and profanity, as indicated by selectable content attributes 824 ("nudity") and 822 ("profanity") of the content descriptor associated with time segment 862. As with selectable content attribute 802 in FIG. 8A, selectable content attributes 824 and 822 are generated with the same features as those discussed in relation to selectable content attributes 726 and 728 as discussed in relation to FIG. 7. Similar to the selection of attribute 852 in tag cloud 850 of FIG. 8A, in response to receiving a user selection of attribute 854 (e.g., "body"), control circuitry 304 instructs display 312 to display interface 1000 which lists all user-generated messages associated with time segment 862 of media asset 870.

In some embodiments, control circuitry 304 displays user-generated messages relating to the selected attribute 854 (e.g., "body"), which may or may not be all user-generated messages associated with time segment 862 of media asset 870. Further details about interface 1000 are discussed later on in relation to FIG. 10. As interface 800 in FIGS. 8A and 8B illustrates the changing content of a media asset via attributes of a tag cloud that change across different time segments of the media asset, users are more easily able to visualize change of content type within a media asset over time.

Figure 9:
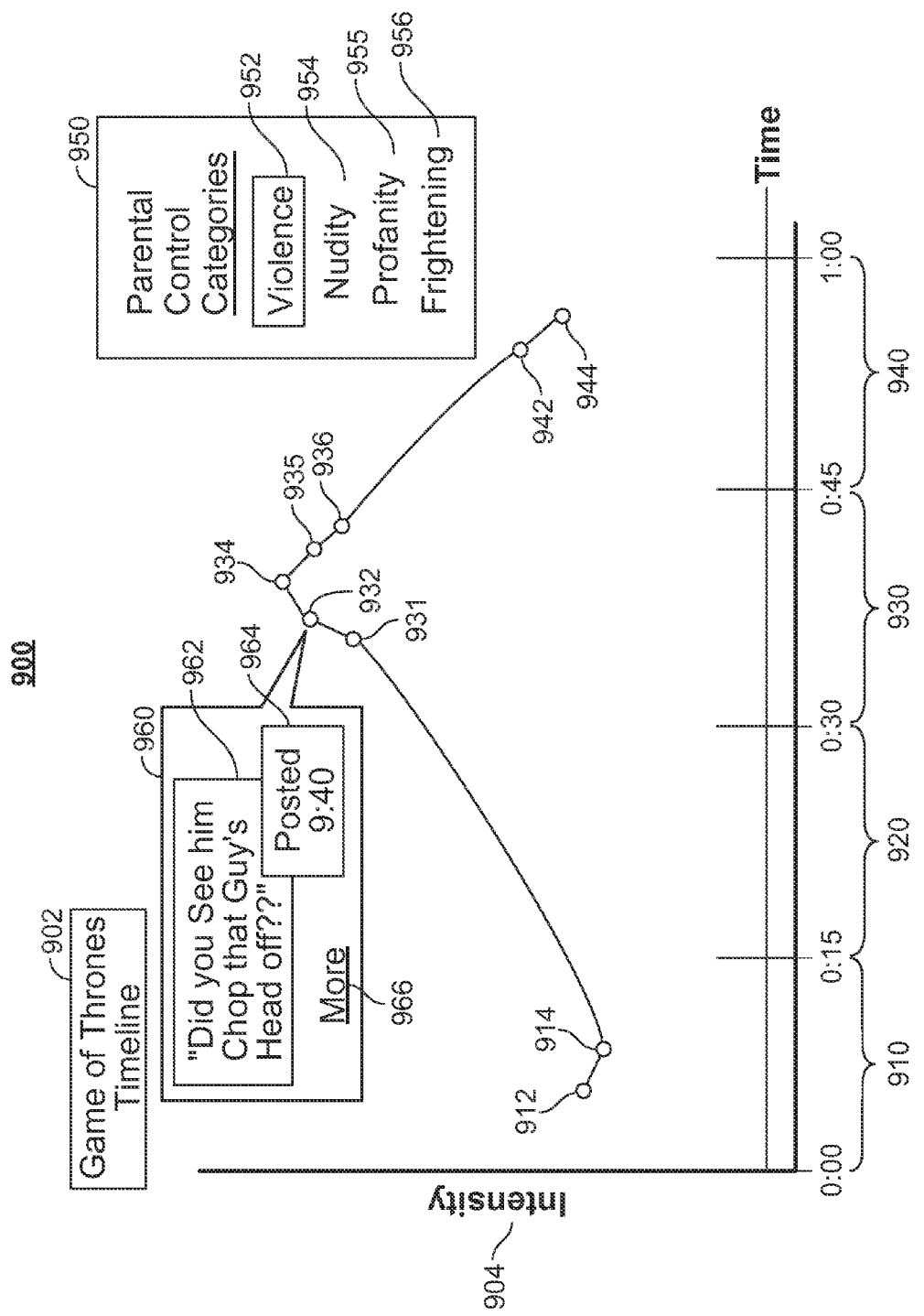
FIG. 9 is an illustrative interface for interacting with a temporal visualization of media asset content that represents different levels of attributes across different time segments of a media asset in accordance with some embodiments of the disclosure.

FIG. 9 is an illustrative interface for interacting with a temporal visualization of media asset content that represents different levels of attributes across different time segments of a media asset in accordance with some embodiments of the disclosure. In some embodiments, remote server 415 may determine one or more attributes (e.g., 952 ("violence"), 954 ("nudity"), 955 ("profanity"), 956 ("frightening"), etc.) of a particular media asset in accordance with any of the mechanisms described above for determining content attributes in relation to FIGS. 5-8. In some embodiments, remote server 415 may compute a level of each of the determined attributes corresponding to content within each of a plurality of time segments of the media asset (e.g., 910, 920, 930, 940) by processing user-generated messages associated with different time segments of a media asset. Remote server 415 may store the computed levels of each of the attributes in remote storage. In response to receiving a user selection of a media asset (e.g., program listing 108) from a media guidance display (e.g., program listings display 100), control circuitry 304 of user equipment device 300 may retrieve these stored attribute levels for one or more attributes of the selected media asset from remote server 415. Control circuitry 304 uses this retrieved attribute level information, as computed by remote server 415, to generate for display a graphical histogram (e.g., 900) that represents change in the levels of a given attribute across different time segments of a media asset. This graphical histogram visually associates computed levels of a given attribute with its corresponding time segment of the media asset.

In some embodiments, the graphical histogram may look like illustrative graphical histogram 900. Illustrative graphical histogram 900 visually represents changes in levels of attributes (e.g., 952, 954, 955, 956) across different time segments (e.g., 910, 920, 930, 940) of a media asset. A user of user equipment device 300 may use illustrative graphical histogram 900 to get a sense of which segments of a media asset exhibit peak levels of certain attributes. For example, in response to receiving a user selection of a parental control feature related to a media asset (e.g., 902), control circuitry 304 may retrieve, from remote server 415, a set of content attributes representing content that may be objectionable to children of certain ages. For example, these content attributes may be parental control categories such as "violence" (952), "nudity" (954), "profanity" (955), and "frightening" (956). In other embodiments, attributes may be any sort of content attribute that may or may not be related to parental control.

In conjunction with retrieving the set of content attributes from remote server 415, control circuitry 304 may also retrieve the computed levels of each of the attributes (952, 954, 955, 956) and store the computed levels in local storage 308. For example, illustrative graphical histogram presents the changes in the level of a "violence" attribute associated with the media asset "Game of Thrones" 902. In some embodiments, control circuitry 304 may plot the attribute level as intensity 904 vs. time in a line graph. Any other time-based graphical representation may also be used. Control circuitry 304 instructs display 312 to highlight the "violence" attribute 952 in attribute key 950 to indicate which attribute is being represented.

In some embodiments, control circuitry 304 may retrieve some or all user-generated messages associated with a particular time segment of a media asset and are characterized by a given attribute. For example, each of plot points 912, 914, 931, 932, 934, 935, 936, 942, and 944 represent a different user-generated message that is characterized by the "violence" attribute 952. For example, plot point 932 represents a user message 962 ("Did you see him chop that guys' head off??") posted at time 962 ("9:40") about media asset 902 ("Game of Thrones"). As shown in graphical histogram 900, user message 962 is associated with a higher level of violence than most of the other user messages received for that particular media asset. Based on the visual representation of attribute levels across time segments of a media asset, a user of user equipment device 300 gets a better sense of those segments which exhibit peak levels of violence (e.g., time segment 930). A parent may use this information to determine which segments to skip over and which segments are probably more appropriate for children to view (e.g., time segment 910 based on low levels of the "violence" attribute).

In some embodiments, plot points in the graphical histogram representing user-generated messages may be selectable. For example, in response to receiving a user selection of plot point 932 corresponding to user-generated message 960, control circuitry 304 may instruct display 312 to display an overlay 960 which includes an excerpt or entirety of the corresponding user-generated message 960. Alternatively, control circuitry 304 may skip the overlay and directly display the information related to the user-generated messages in a new information screen (e.g., illustrative interface 1000). In some embodiments, control circuitry 304 may also instruct display 314 to display a link 966 ("More") that directs the user to another screen which contains more information about that particular user-generated message 960 or all user-generated messages associated with the corresponding time segment 920 of media asset 902. In some embodiments, in response to receiving a user selection of link 966, control circuitry 304 may instruct display 312 to display interface 1000. Further details about interface 1000 are discussed below in relation to FIG. 10. In some embodiments, the plot points (e.g., 912, 914, 931, 932, etc.) displayed in graphical histogram 900 may represent multiple user-generated messages.

In these embodiments, control circuitry 304 may instruct display 312 to display overlay 960 to include the multiple user-generated messages associated with the plot point instead of just a single user-generated message. In such cases, each time segment of a media asset may only be associated with a single plot point instead of multiple.

While illustrative graphical histogram 900 only displays the levels of the "violence" attribute for the media asset 902 in FIG. 9, graphical histogram may also display levels of any other attribute retrieved by control circuitry 304 for the media asset 902. For example, attributes 952, 954, 955 and 956 in attribute key 950 may be selectable. In some embodiments, control circuitry 304 may receive a user selection of the "nudity" attribute 954. In response to receiving this user selection, control circuitry 304 display a graphical histogram representing the change in levels of the "nudity" attribute 954 across different segments of the media asset. Control circuitry 304 may perform the same or similar process of visualizing changing levels of attributes for any other attribute retrieved for the media asset.

Figure 10:
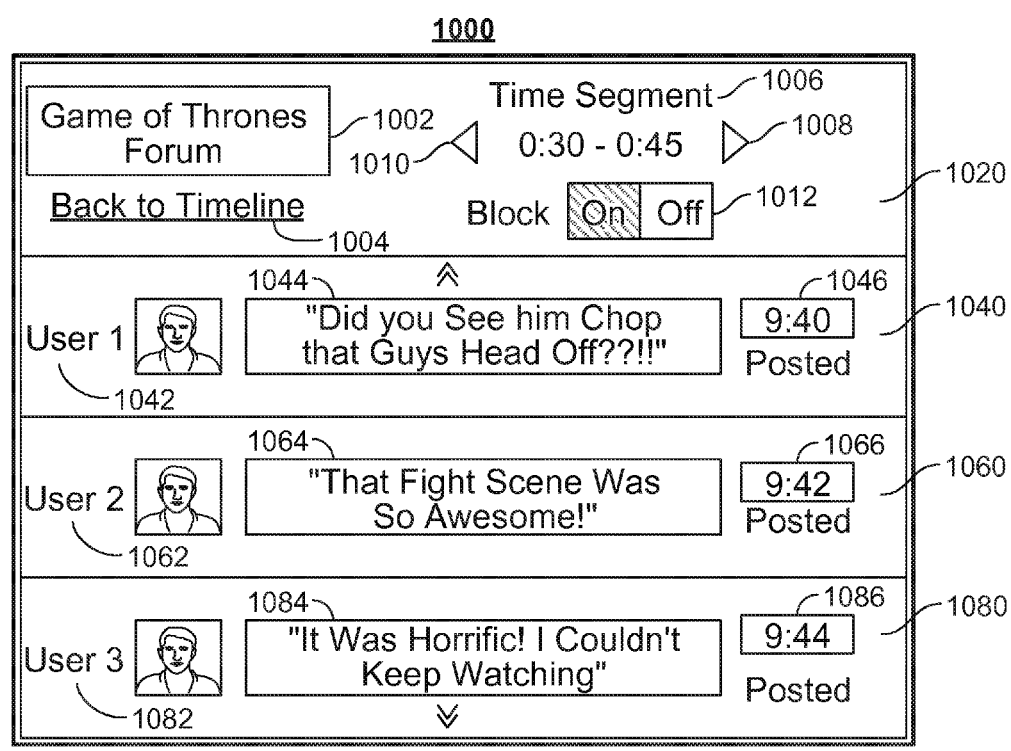
FIG. 10 is an illustrative interface for navigating through user-generated messages associated with different time segments of a media asset in accordance with some embodiments of the disclosure.

FIG. 10 is an illustrative interface for navigating through user-generated messages associated with different time segments of a media asset in accordance with some embodiments of the disclosure. Control circuitry 304 may generate illustrative interface 1000 based on retrieved user-generated messages from remote server 415 that are related to one or more time segments of a media asset. Control circuitry 304 may instruct display 312 to display the interface 1000 in response to any number of selection selections, such as a user selection of any of the plot points in graphical histogram 900, any of the attributes display tag cloud 850, any of the attributes displayed as part of a content descriptor in graphical timelines 500, 600, 700, and 800, any of the time segments displayed in the aforementioned graphical timelines, and an other options that enable a user to view more information about user-generated messages associated with a particular segment of a media asset.

Illustrative interface 1000 may be divided into different sections. In some embodiments, one section may be the header section 1020, which displays information such as the title of the page 1002 (e.g., "1002") and any or all of various options 1004, 1008, 1010, and 1012 for navigating through content related to various segments of a media asset. In response to receiving a user selection of option 1004 ("Back to timeline"), control circuitry 304 instructs display 312 to change the display back to a previously displayed graphical timeline (e.g., any of illustrative graphical timelines 500, 600, 700, 800, and 900). In response to receiving a user selection of option 1008, control circuitry 304 retrieves from local storage 308 or remote server 415 user-generated messages associated with the next time segment of the media asset. For example, if the presently displayed time segment 1006 is "0:30-0:45" of a media asset (e.g., "Game of Thrones"), the next time segment may be "0:45-1:00" of the media asset. Control circuitry 304 then instructs display 312 to display these retrieved user-generated messages in interface 1000. Similarly, in response to receiving a user selection of option 1010, control circuitry 304 may instruct display 312 to retrieve user-generated messages associated with the previous time segment (e.g., "0:30-0:45") of the media asset and display the retrieved user-generated messages in interface 1000.

In some cases, a parent who reads the subsequent user-generated messages may decide that the relevant time segment 1006 is not appropriate for her children to view. In response to receiving a user selection of toggle option 1012, control circuitry 304 may store a setting in local storage 308 to block display of content from the relevant time segment 1006 ("0:30-0:45"). Depending on the current state of the block setting, control circuitry 304 may also unblock display of content from that relevant time segment. For example, if the block setting is currently "off" and the user toggles it to turn it "on", control circuitry 304 will block the current segment from viewing. Otherwise, if the block setting is currently "on" and the user toggles it to turn it "off", control circuitry 304 will allow the current segment to be viewed. In some embodiments (not shown), control circuitry 304 may retrieve other information (e.g., content ratings, summaries, content tags, awards, cast information, trailers, purchasing information, etc.) about the particular time segment or the media asset as a whole in interface 1000.

In some embodiments, interface 1000 includes a section displaying user-generated messages associated with a particular time segment 1006. These user-generated messages (e.g., 1044, 1064, 1084) may be user reviews or comments about a media asset, forum postings, any other online source, and any printed source. Control circuitry 304 may retrieve these user-generated messages from one or more sources, including remote server 415, media content source 416, and media guidance data source 418. Each or some of the retrieved user-generated messages may be associated with an individual user (e.g., 1042, 1062, 1082). These users may be users who consume the media asset, produced the media asset, professional critics of the media asset, actors in the media asset, and any other individual that would know about the content within the media asset. Each or some of the retrieved user-generated messages may be associated with a timestamp (e.g., 1046, 1066, 1086). In some cases, the timestamp may represent the time at which the user posted the user-generated message to a website online. In other cases, the timestamp may represent the time at which a printed (either by paper or digitally) was published. In yet other cases, remote server 415 may automatically approximate a time segment for which the user-generated message is referring to and use that approximated time as the timestamp. Overall, illustrative interface 1000 provides users with more detailed information about the user-generated messages that were used to create graphical timelines of varying content across time segments of a media asset so that the user can make more informative decisions about whether the content within a given segment is appropriate and/or is of interest to consume.

Figure 11:
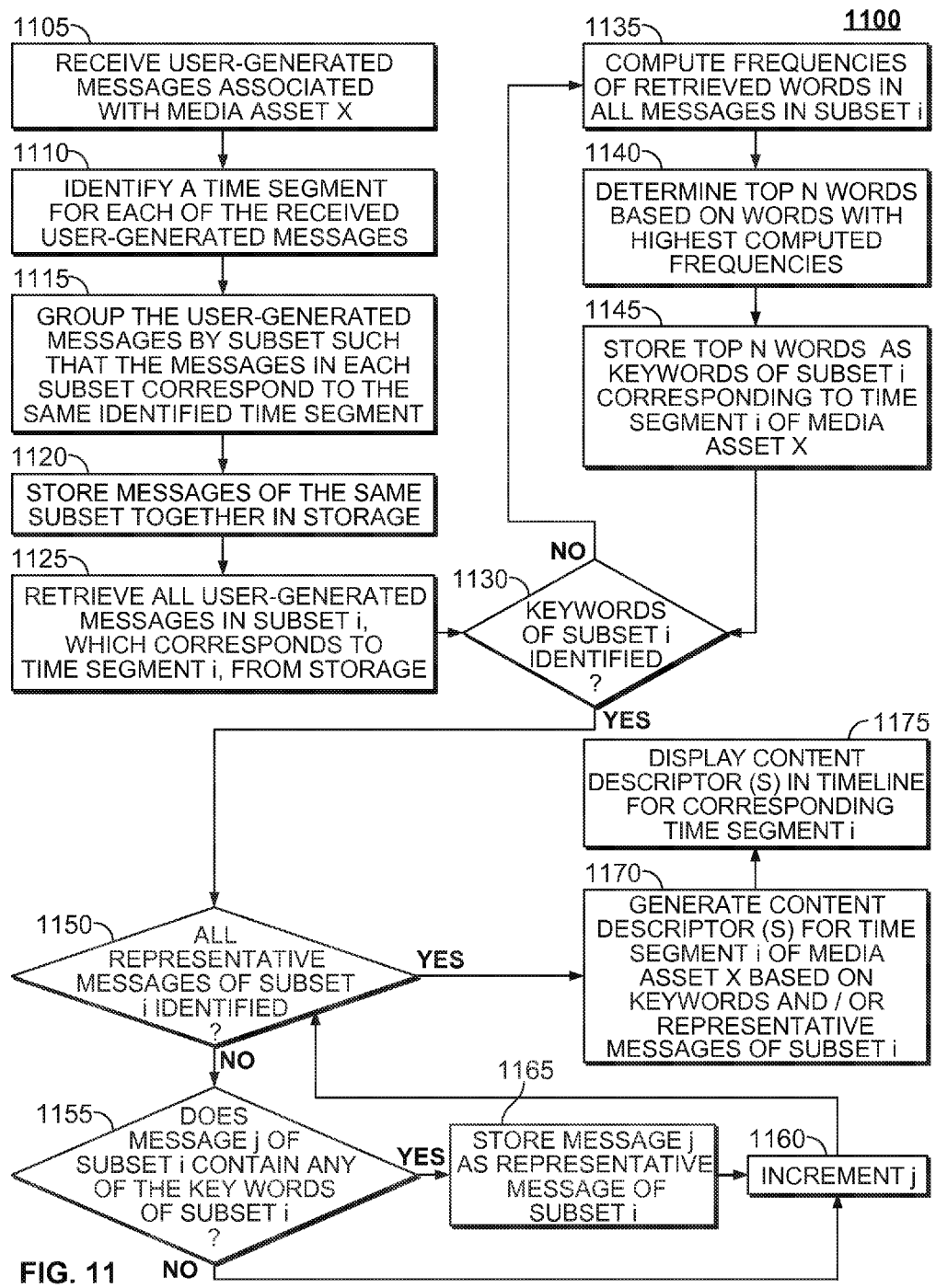
FIG. 11 is a flow-chart of illustrative steps involved in generating content descriptors for content within a particular time segment of a media asset in accordance with some embodiments of the disclosure.

FIG. 11 is a flow-chart of illustrative steps involved in generating content descriptors for content within a particular time segment of a media asset in accordance with some embodiments of the disclosure. Although the following steps of flow-chart 1100 will be discussed as predominantly being performed by a control circuitry of remote server 415, it should be understood that each and any of the illustrative steps described in flow-chart 1100 may be performed by control circuitry at remote server 415, control circuitry 304 of user equipment device 300, and or a combination of both.

In some embodiments, at step 1105, control circuitry of remote server 415 receives user-generated messages associated with a media asset X (e.g., the TV show "Game of Thrones"). At step 1110, control circuitry of remote server 415 identifies a time segment for each of the received user-generated messages. As mentioned in an earlier section, remote server 415 may use any mechanism to identify time segments of a user-generated message. In some embodiments, remote server 415 may determine a time segment of a user-generated message based on an explicit timestamp included in the user-generated message. For example, the timestamp may be the time a user-generated message was posted online or published in a publication.

In other embodiments, remote server 415 may determine a time segment based on processing the content of a user-generated message and cross-referencing a database stored in remote storage or any other storage to determine that the events described within a user message refers to a particular known segment of a media asset. Further details about these mechanisms for identifying time segments corresponding to user-generated input are described in greater detail in Woods et al. U.S. Patent Application Publication No. 2013/0311575, filed May 16, 2012, and Woods et al. U.S. Patent Application Publication No. 2013/0297706, filed May 3, 2012, which are hereby incorporated by reference herein in their entireties.

At step 1115, control circuitry of remote server 415 groups the user-generated messages by subset such that the messages in each subset correspond to the same identified time segment. For example, control circuitry of remote server 415 may determine which user-generated messages from the received user-generated messages relate to events occurring during a first time segment of media asset X. In response to this determination, control circuitry of remote server 415 may group these user-generated messages associated with the first time segment together as a first subset. Similarly, in response to determining that a second set of user-generated messages comment on events occurring a second time segment, control circuitry of remote server 415 may group these user-generated messages associated with the second time segment together as a second subset.

At step 1120, control circuitry of remote server 415 may store each subset of messages corresponding to the various time segments of a media asset in storage. Control circuitry of remote server 415 may store the subsets of user-generated messages on remote storage (not shown) of remote server 415, local storage 308 of user equipment device 300, entirely on both, or partly on remote storage and partly on local storage 308.

At step 1125, control circuitry of remote server 1125 retrieves all user-generated messages in a given subset i, which corresponds to time segment i, from storage and proceeds to process each of the user-generated messages in the subset in accordance to the illustrative steps 1130, 1135, 1140, 1145, as described as follows.

At step 1130, control circuitry of remote server 415 determines if keywords of subset i have been identified. As discussed above, keywords may be any words or phrases that are representative of content (e.g., events, genre, characters, sentiment, etc.). In response to determining that the keywords of subset i have not been identified, control circuitry of remote server 415 proceeds to steps 1135-1145 to determine a set of keywords representative of content within segment i of media asset X based on user-generated messages in subset i.

At step 1135, control circuitry of remote server 415 computes frequencies of words in all the user-generated messages in subset i. In some embodiments, control circuitry of remote server performs a pre-processing step to filter out all extraneous words (e.g., prepositions, articles, conjunctions, filler words, etc.) that do not provide meaning on their own. Control circuitry of remote server 415 then proceeds to compute frequencies of the filtered set of words.

In some embodiments, control circuitry of remote server 415 may determine the top n (any integer value) words used in the user-generated messages of subset i based on the computed frequencies of non-extraneous words at step 1135. The n values may be predetermined or vary based on storage capacity of remote storage of remote server 415 and/or local storage 308 of user equipment device 300.

In some embodiments, control circuitry 304 stores, in either remote storage or local storage 308, these top n words as "keywords" of subset i, which correspond to time segment I of media asset X. For example, if n=1, only one keyword is stored for subset i. In another example, if n=3, and control circuitry of remote server 415 determines at step 1140 that the 3 most frequently non-extraneous words used in subset i are "bloody", "violent", and "scared", control circuitry of remote server 415 stores all 3 keywords in storage and proceeds back to step 1130.

In response to determining that keywords have been for the entire set of user-generated messages in subset i at step 1130, control circuitry of remote server 415 proceeds to step 1150 to determine whether all representative messages of subset i have also been identified. In some embodiments, step 1130 also involves control circuitry of remote server 415 determining whether any new user-generated messages have been stored or any older user-generated messages removed from storage since the last time step 1130 was performed. In these embodiments, even if keywords for the older subset i have been identified, control circuitry of remote server 414 may still perform steps 1135-1145 in response to determining that the number of user-generated messages in subset has changed.

In response to determining that all or just some of the representative messages of subset i have not been identified at step 1150, control circuitry of remote server 415 proceeds to step 1155 to identify all or some of the representative messages of subset i. In some embodiments, "representative" messages may be messages that include one or more of the keywords that were identified at step 1140 and stored at step 1145. To determine whether a given user-generated message j is "representative" of content within a particular time segment i, control circuitry of remote server 415 determines whether message j of subset i contains any of the keywords stored at step 1145. In some embodiments, in response to determining that message j does include one or more of the keywords of subset i, control circuitry of remote server 415 stores message j as a "representative" message of subset i at step 1165 in remote storage or local storage 308. Control circuitry of remote server 415 then proceeds to step 1160 to increment j so that it can proceed back to step 1150 to determine whether all representative messages have now been identified for subset i. Alternatively, in response to determining at step 1155 that message j does not contain any keywords of subset i stored at 1145, control circuitry of remote server 415 does not store message j as a "representative" message and proceeds directly to step 1160 to increment j so that control circuitry can determine whether all representative messages of subset i have been identified at back at step 1150.

In response to determining that all representative messages of subset i have not yet been identified (i.e., there are still more messages to process in accordance with illustrative steps 1155, 1165, and 1160"), control circuitry of remote server 415 proceeds to step 1155 again to determine whether a new message j (since j has now been increment in value) contains any of the keywords in subset i. Control circuitry of remote server 415 performs steps 1155-1160 until all messages of subset i have been examined.

In response to determining that all representative messages of subset i have been identified and stored at step 1150, control circuitry of remote server 415 proceeds to step 1170. At step 1170, control circuitry of the remote server 415 and/or control circuitry 304 of user equipment device 300 may generate content descriptors for time segment i of media asset X based on keywords, as determined from steps 1130-1145) and/or representative messages of subset i, as determined from steps 1150-1165.

In some embodiments, control circuitry of remote server 415 may transmit information about the keywords and representative messages stored for subset i to user equipment device 300. In response to receiving the transmitting content information for subset i, control circuitry 304 of user equipment device 300 may generate one or more content descriptors corresponding to time segment i based on the transmitted content information corresponding to subset i. In some embodiments, control circuitry 304 may generate a content descriptor that includes all n keywords stored at step 1145 by remote server 415. In some other embodiments, control circuitry 304 may generate a content descriptor that only includes less than n keywords. In some embodiments, control circuitry 304 may generate a content descriptor including excerpts or entireties of the representative messages stored for subset i. In some other embodiments, control circuitry 304 may combine keywords with representative messages and include both in a content descriptor. In some embodiments, the content descriptor may be selectable label with text, and in some embodiments, the control descriptor may be a tag cloud, wherein the keywords comprise the attributes that are used to generate the tag cloud (see, e.g., tag cloud 850 in FIG. 8).

At step 1175, control circuitry 304 displays the generated content descriptor for time segment i based on the information received from remote server about keywords and/or representative messages of subset i.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

Figure 12:
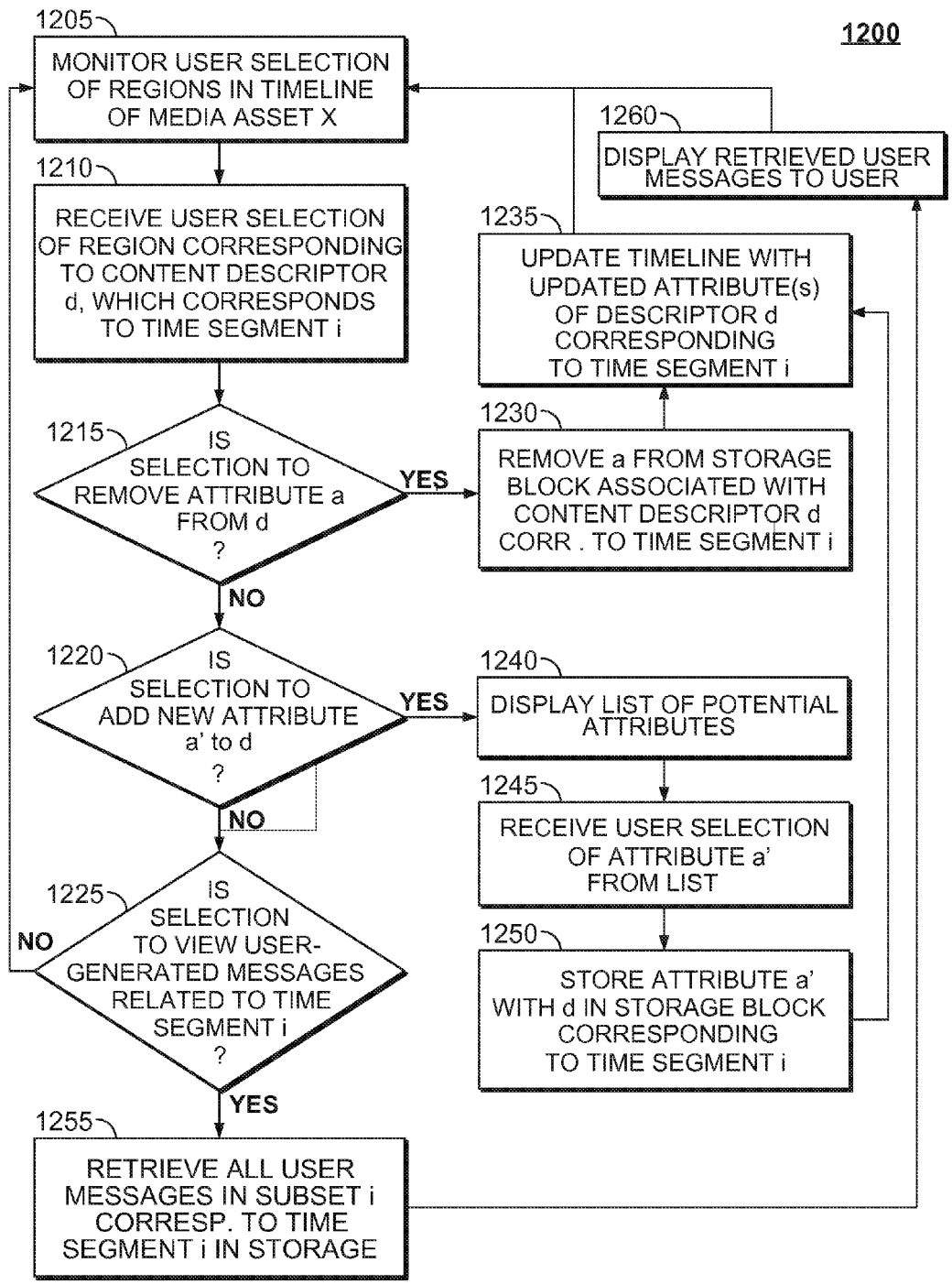
FIG. 12 is a flow-chart of illustrative steps involved in updating content descriptors in a timeline responsive to user selections to edit a currently displayed content descriptor in accordance with some embodiments of the disclosure.

FIG. 12 is a flow-chart of illustrative steps involved in updating content descriptors in a timeline responsive to user selections to edit a currently displayed content descriptor. At step 1205, control circuitry 304 of user equipment device 300 monitors an interface of a graphical timeline (e.g., any of 500, 600, 700, 800, and 900) for a user selection of any regions in the timeline for media asset X (e.g., the TV show "Game of Thrones"). For example a user may select the region in a timeline that corresponds to a content descriptor d, which corresponds to time segment i.

In response to receiving a user selection of a region corresponding to time segment i in a displayed timeline (e.g., 700) at step 1210, control circuitry 304 proceeds to determine whether the selection corresponds to any options used for editing a content descriptor in a timeline.

At step 1215, control circuitry 304 determines if the received user selection is for removing attribute "a" from content descriptor d. For example, a user may select the removal option 728 associated with attribute 726 ("nudity") of a content descriptor corresponding to time segment 720. In response to determining that the received user selection is for removing attribute "a" from content descriptor d at step 1215, control circuitry 304 instructs storage circuitry 308 to remove attribute "a" from the storage block associated with content descriptor d of time segment i. Control circuitry 304 then proceeds to step 1235, where it instructs display 312 to update the graphical timeline with the updated information regarding attributes corresponding to content descriptor d and time segment i. For example, if a user selects the removal option 728 to remove the "nudity" attribute 726 from the content descriptor corresponding to time segment 720, the updated timeline would no longer visually associate the "nudity" attribute with time segment 720 in the graphical timeline 700.

In response to determining that the received user selection was not to remove an attribute a from content descriptor d, control circuitry 304 may determine at step 1220 whether the selection was instead for adding a new attribute to content descriptor d corresponding to time segment i. For example, a user may select the add option 729 (e.g., "+") for time segment 720 in graphical timeline 700. In response to receiving a user selection to add a new attribute to content descriptor d for time segment i, control circuitry 304 proceeds to step 1240. At step 1240, control circuitry 304 retrieves a list of potential attributes from local storage 308 or directly from remote storage on remote server 415. Control circuitry 304 instructs display 312 to display the retrieved list of potential attributes. In some embodiments, control circuitry 304 may instruct the list of potential attributes to be displayed in an overlay, as shown in illustrative overlay 750. At step 1245, control circuitry 304 receives a user selection of one of the attributes a' in the list. For example, the user may select the "romance" attribute 752 from the list. In response to receiving a user selection of one of the displayed listed of potential attributes a', control circuitry 304 stores at step 1250 the newly selected attribute a' in a storage block corresponding to time segment i (e.g., time segment 720) in either local storage 308 or remote storage of remote server 415. Control circuitry then proceeds to step 1235. At step 1235, control circuitry 304 instructs display 312 to update the displayed timeline with the added attribute selected by the user at step 1245.

In response to determining that the received user selection at 1210 is not for adding a new attribute for content descriptor d at step 1220, control circuitry 304 determines at step 1225 whether the received user selection at 1210 is for viewing user-generated messages related to time segment i. For example, a user may select the selectable "violence" attribute corresponding to time segment 720 in timeline 700. In another example, a user may select any of the selectable attributes (e.g., 852) in tag cloud 850 in timeline 805. In another example, a user may select option 658 in timeline 600 or option 966 in timeline 900 to view user-generated messages relating to a corresponding time segment.

In response to determining at step 1225 that the received user selection is for viewing user-generated messages relating to content within a time segment i, control circuitry 304 retrieves at step 1255 from local storage 308 or remote storage of remote sever 415 all user-generated messages in subset i which correspond to time segment i. Control circuitry 304 then proceeds to step 1260. At step 1260, control circuitry 304 instructs display 312 to display the user messages retrieved at step 1255 to the user. For example, control circuitry 304 may instruct the display of illustrative interface 1000 which provides an interactive display of user-generated messages associated with a particular time segment 1006 and characterized by a particular common attribute (e.g., "violence").

After control circuitry 304 updates the timeline at step 1235, control circuitry 304 proceeds back to the monitoring step at 1205. Similarly, after performing step 1260, control circuitry 304 proceeds back to monitoring step at 1205.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 12.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for visualizing content across different time segments of a media asset, the method comprising:
   retrieving information about content within each of a plurality of time segments of a media asset, wherein the retrieved information is generated based on processing user-generated messages corresponding to each of the plurality of time segments;
   storing the retrieved information about the content;
   generating, using control circuitry, a plurality of content descriptors based on the information, wherein each of the plurality of content descriptors corresponds to one of the plurality of time segments;
   generating for display, using the control circuitry, a timeline independently of presenting the media asset, wherein the timeline visually associates each of the plurality of content descriptors with the corresponding time segment of the media asset;
   receiving a user selection of a first content descriptor, of the plurality of content descriptors, in the timeline, wherein the first content descriptor corresponds to a first time segment of the plurality of time segments;
   in response to receiving the user selection, causing, using the control circuitry, a first subset of the user-generated messages to be displayed before presenting the media asset, wherein each user-generated message in the first subset corresponds to the first time segment;
   determining an attribute of the media asset;
   computing a first level of the attribute corresponding to content within the first time segment of the media asset based on the first subset of the user-generated messages;
   computing a second level of the attribute corresponding to content within the second time segment of the media asset based on a second subset of the user-generated messages; and
   generating a graphical histogram representing change in level of the attribute across the plurality of time segments of the media asset, wherein the histogram visually associates the computed first level of the attribute with the first time segment and the computed second level of the attribute with the second time segment.

2. The method of claim 1, wherein the processing comprises:
   determining that a subset of the user-generated messages corresponds to the first time segment, wherein the determined subset is the first subset; and
   computing frequencies of words used in the user-generated messages of first subset.

3. The method of claim 2, wherein the processing further comprises:
   based on the computed frequencies, determining that a first portion of the user-generated messages of the first subset is representative of content within the first time segment of the media asset; and
   generating the first content descriptor such that the first content descriptor includes the first portion.

4. The method of claim 1, wherein the processing comprises performing sentiment analysis on the user-generated messages of the first subset to determine an overall viewing sentiment corresponding to the first time segment.

5. The method of claim 1, wherein the first content descriptor comprises at least one of:
   a portion of a user review commenting on the first time segment of the media asset,
   a keyword that represents content within the first time segment of the media asset,
   a genre that represents content within the first time segment of the media asset, and
   a sentiment that represents overall sentiment of the first subset of user-generated messages.

6. The method of claim 1, further comprising:
   determining a plurality of attributes that characterize content within the first time segment based on the first subset of the user-generated messages;
   generating a selectable tag cloud as the first content descriptor, wherein the selectable tag cloud is comprised of the determined plurality of attributes;
   receiving a user selection of an attribute of the plurality of attributes in the selectable tag cloud; and
   in response to receiving the user selection of the attribute, causing a second subset of the user-generated messages to be displayed, wherein every user-generated message in the second subset is characterized by the selected attribute.

7. The method of claim 1, further comprising:
   generating, for display on the timeline, a tag cloud that represents content within the first time segment of the media asset based on the first subset of the user-generated messages; and
   in response to processing of user-generated messages corresponding to a second time segment of the plurality of time segments, updating the tag cloud displayed in the timeline to represent content within the second time segment of the media asset.

8. The method of claim 1, further comprising:
   receiving an indication from the user to change the displayed first content descriptor;

in response to receiving the indication, generating for display a list of attributes to the user; and
updating the first content descriptor with a selected attribute from the list of attributes.

9. The method of claim 1, further comprising:
determining which of the plurality of time segments corresponds to the highest number of the user-generated messages; and
visually highlighting the determined time segment in the displayed timeline.

10. A system for visualizing content across different time segments of a media asset, the system comprising:
storage circuitry configured to:
store information about content within each of a plurality of time segments of a media asset, wherein the retrieved information is generated based on processing of user-generated messages corresponding to each of the plurality of time segments; and
control circuitry configured to:
retrieve the information about the content;
generate for display a plurality of content descriptors based on the retrieved information, wherein each of the plurality of content descriptors corresponds to one of the plurality of time segments;
generate for display a timeline independently of presenting the media asset, wherein the timeline visually associates each of the plurality of content descriptors with the corresponding time segment of the media asset;
receive a user selection of a first content descriptor, of the plurality of content descriptors, in the timeline, wherein the first content descriptor corresponds to a first time segment of the plurality of time segments;
in response to receiving the user selection, cause a first subset of the user-generated messages to be displayed before presenting the media asset, wherein each user-generated message in the first subset corresponds to the first time segment;
determine an attribute of the media asset;
compute a first level of the attribute corresponding to content within the first time segment of the media asset based on the first subset of the user-generated messages;
compute a second level of the attribute corresponding to content within the second time segment of the media asset based on a second subset of the user-generated messages; and
generate a graphical histogram representing change in level of the attribute across the plurality of time segments of the media asset, wherein the histogram visually associates the computed first level of the attribute with the first time segment and the computed second level of the attribute with the second time segment.

11. The system of claim 10, wherein the control circuitry is configured to process the user-generated messages by:
determining that a subset of the user-generated messages corresponds to the first time segment, wherein the determined subset is the first subset; and
computing frequencies of words used in the user-generated messages of first subset.

12. The system of claim 11, wherein the control circuitry is further configured to:
based on the computed frequencies, determine that a first portion of the user-generated messages of the first subset is representative of content within the first time segment of the media asset; and
generate the first content descriptor such that the first content descriptor includes the first portion.

13. The system of claim 10, wherein the control circuitry is configured to process the user-generated messages by performing sentiment analysis on the user-generated messages of the first subset to determine an overall viewing sentiment corresponding to the first time segment.

14. The system of claim 10, wherein the first content descriptor comprises at least one of:
a portion of a user review commenting on the first time segment of the media asset,
a keyword that represents content within the first time segment of the media asset,
a genre that represents content within the first time segment of the media asset, and
a sentiment that represents overall sentiment of the first subset of the user-generated messages.

15. The system of claim 10, wherein the control circuitry is further configured to:
determine a plurality of attributes that characterize content within the first time segment based on the first subset of the user-generated messages;
generate a selectable tag cloud as the first content descriptor, wherein the selectable tag cloud is comprised of the determined plurality of attributes;
receive a user selection of an attribute of the plurality of attributes in the selectable tag cloud; and
in response to receiving the user selection of the attribute, cause a second subset of user-generated messages to be displayed, wherein every user-generated message in the second subset is characterized by the selected attribute.

16. The system of claim 10, wherein the control circuitry is further configured to:
generate, for display on the timeline, a tag cloud that represents content within the first time segment of the media asset based on the first subset of the user-generated messages; and
in response to processing user-generated messages corresponding to a second time segment of the plurality of time segments, update the tag cloud displayed in the timeline to represent content within the second time segment of the media asset.

17. The system of claim 10, wherein the control circuitry is further configured to:
receive an indication from the user to change the displayed first content descriptor;
in response to receiving the indication, generate for display a list of attributes to the user; and
update the displayed first content descriptor with a selected attribute from the list of attributes.

18. The system of claim 10, wherein the control circuitry is further configured:
determine which of the plurality of time segments corresponds to the highest number of the user-generated messages; and
visually highlight the determined time segment in the displayed timeline.

* * * * *